United States Patent Office 3,210,216
Patented Oct. 5, 1965

3,210,216
BRAZING GOLD ALLOY AND THERMOELECTRIC DEVICE PRODUCED THEREWITH
William Feduska, Emsworth, Pa., assignor to Westinghouse Electric Corporation, East Pittsburgh, Pa., a corporation of Pennsylvania
No Drawing. Filed Feb. 9, 1962, Ser. No. 172,122
5 Claims. (Cl. 136—4)

The present invention relates to a brazing alloy for joining thermoelectric members to electrical conductors and being capable of sustaining operating temperatures of up to 600° C.

Heretofore in the prior art, the fabrication of a thermoelectric couple comprising an n-type thermoelectric material, such as, lead telluride and a p-type thermoelectric material, such as, germanium bismuth telluride, two separate operations are required to join each of the thermoelectric bodies to an electrically and thermally conductive member with presently known brazing alloys. For example, an electrically conductive connecting strap comprising nickel was plated with nickel-phosphorus to a thickness of about 5 mils. This layer was then ground off the strap in the location where the "n" pellet was to be joined. An alloy strip preform, for instance, of a 10% zinc–90% gold brazing alloy was placed on the ground region and a lead telluride pellet having a diffusion barrier layer on the ends thereof was placed on the strip. The assembly was then disposed in a graphite brazing jig that spring loaded the parts in compression. The assembly was then placed into a furnace and subjected to a temperature of approximately 740° C. to form a joint between the lead telluride pellet and the strap. After this "n" leg brazing step the "p" leg was pre-assembled. A germanium bismuth telluride pellet was placed on the nickel phosphorus layer of the strap. The assembly was jigged and furnace brazed by using the same procedure as described for the "n" type lead telluride pellet except that the germanium bismuth telluride was joined to the strap at a temperature of 685° C. The disadvantages of this procedure are readily apparent. First, two separate operations are required to fabricate the couple. Each operation involves degreasing the parts, jigging, unjigging, two separate brazing cycles and two cooling cycles. Secondly, the initial heating to 740° C. of the nickel-phosphorus coating may cause some reaction between the nickel and phosphorus to produce $Ni_3P$. These preheated coatings have not been able to produce, generally, joints of high strength to the germanium bismuth telluride in the subsequent joining operations.

A brazing alloy, capable of joining the lead telluride at a temperature of about 685° C. (the temperature required to join germanium bismuth telluride to the plated strap) would eliminate many of the disadvantages of the two-step brazing operation.

Therefore, the object of the present invention is to provide a brazing alloy having a melting temperature range of from 625° C. to 680° C., capable of joining a lead telluride thermoelectric material to an electrical conductor, the joint formed thereby having relatively low electrical resistance.

Another object of the invention is to provide a brazing alloy comprising by weight from about 0.2% to 1% tin, from 10% to 12.7% zinc and the balance being gold with small amounts of incidental impurities.

Other objects of the invention will in part, be obvious and will, in part, appear hereinafter.

In accordance with the present invention and in attainment of the foregoing objects, there is provided a thermoelectric device having one or more "n" legs consisting of lead telluride or a material capable of operating within the same temperature range and one or more "p" legs consisting of a material that is useful in the same temperature range as the n-type material, for instance, germanium bismuth telluride. The "p" and "n" legs are formed by measuring a desired amount of the type of thermoelectric material required and either pressing or casting the same into a pellet. The ends of the "p" and "n" legs may have disposed thereon a metallic diffusion barrier layer of at least two mils thickness to insure against interaction of the thermoelectric materials with any other metal that may come into contact with the same in a subsequent contacting or joining operation. However, in many instances a thickness of 10 mils may be required to insure that the barrier layer is sound and continuous. It is preferred to apply the diffusion barrier layer by pressing a powdered metal upon the ends of the pellets. The diffusion barrier layer may consist of one or more of the metals, iron, nickel, cobalt and molybdenum. The "p" and "n" legs are connected on one end by an electrical and thermal conductor, such as, a metal plate or strap which may be composed of any of the materials set forth as being suitable for the diffusion barrier layers. Metal caps with electrical conductors extending therefrom may be disposed on the other ends of the pellets. When the p-type thermoelectric material is germanium bismuth telluride, the cap on the other end of the pellet must be first coated with a layer of nickel phosphorus. The legs are joined to the conductor and metal caps at a temperature of from 625° C. to 685° C. The "p" leg consisting of germanium bismuth telluride is directly joined to the electrical conductors by means of the nickel phosphorus plating. The "n" leg consisting of lead telluride is joined to the conductor and metal cap by a brazing alloy comprising by weight from about 0.2% to 1% tin, from 10% to 12.7% zinc and the balance being gold with small amounts of incidental impurities.

More particularly, a preferred brazing alloy comprises by weight 0.25% tin, 12.7% zinc and the balance gold. The melting temperature of this alloy is about 680° C. which is about the same melting temperature as the nickel phosphorus. Accordingly, by employing the specified brazing alloy a thermoelectric couple comprising lead telluride and germanium bismuth telluride thermoelectric pellets may be joined to an electrical conductor in a one-step brazing operation at the same temperature.

The following example is illustrative of the present invention.

A fifty gram heat of a mixture comprising 12.7% zinc and 0.25% tin, balance gold, was prepared. The alloy components were charged into a Vycor glass tube, which was then filled with helium, evacuated, back-filled with helium and sealed. The sealed alloy was then melted in a furnace for about 1 hour at about 850° C. and then cooled to room temperature. A sample portion of the solid alloy member was used to measure the melting temperature range of the alloy. The remainder of the alloy was used to produce strip for brazing tests.

From cooling curve tests, the melting range of the alloy was determined as being between 625° C. to 680° C., sufficiently low to enable using this alloy to join lead telluride to an electrical conductor at 685° C. The alloy was worked into a strip of about 10 mils in thickness, and the strip was cut into brazing preforms which were etched by a two to one parts by volume solution of concentrated hydrochloric acid and nitric acid, respectively, to remove surface oxides.

A nickel strap was plated with nickel phosphorus to a thickness of about 5 mils and the layer was ground off the strap in the location where the lead telluride pellet was to be joined. A brazing preform strip, ½″ by ¼″ by 5 mils thickness of the prepared brazing alloy was placed on the ground region and a lead telluride pellet having a pressed diffusion barrier layer of about 7 mils in thickness on each end was placed on the strip. Another brazing alloy preform strip was placed on the other end of the lead telluride pellet and a nickel cap was placed on this preform. Finally, a germanium bismuth telluride pellet was disposed on the nickel-phosphorus layer of the nickel strap and a nickel cap coated with nickel phosphorus was disposed on the other end of the pellet. The entire assembly was then placed into a graphite brazing jig that spring loaded all the component parts in light compression. The assembly was placed on a layer of alumina powder in an Inconel tray and the loaded tray was charged into a retort. After being closed and purged with argon for about 20 minutes, the retort was charged into a muffle furnace and heated to 685° C. After holding for ten minutes when the charge reached 685° C., the retort was removed from the furnace and the charge was cooled to room temperature in argon. The couple was removed and tested. The results showed that a strong, low electrical resistance joint was produced between the lead telluride and the nickel strap.

A group of twelve thermoelectric couples were fabricated in this manner and room temperature electrical resistance measurements were made. The results of these measurements are indicated in Table I.

*Table I*

| Couple | Total Resistance (milliohm) | "p" Resistance leg (milliohm) | "n" Resistance leg (milliohm) |
| --- | --- | --- | --- |
| 1 | .76 | .53 | .21 |
| 2 | .80 | .56 | .21 |
| 3 | .76 | .54 | .21 |
| 4 | .78 | .54 | .20 |
| 5 | .80 | .57 | .21 |
| 6 | .80 | .57 | .21 |
| 7 | .77 | .55 | .21 |
| 8 | .74 | .55 | .19 |
| 9 | .75 | .56 | .20 |
| 10 | .79 | .58 | .19 |
| 11 | .84 | .60 | .22 |
| 12 | .69 | .49 | .21 |

For comparison purposes, a group of thermoelectric couples were fabricated using a two-step brazing operation as described previously, wherein the melting temperature of the brazing alloy employed to join lead telluride to the nickel contacts was materially different from the temperature required to join the germanium bismuth telluride pellet to the nickel phosphorus plated nickel strap. In these instances, a gold alloy containing 10% zinc was used to join the lead telluride to the nickel straps and caps. These thermoelectric couples were tested for room temperature electrical resistance and the results are indicated in Table II. It should be noted that the lead telluride pellet was brazed at 740° C. for ten minutes with the gold-zinc alloy and germanium bismuth telluride pellet was brazed at 670° C. for ten minutes.

*Table II*

| Couple | Total Resistance (milliohm) | "p" Resistance leg (milliohm) | "n" Resistance leg (milliohm) |
| --- | --- | --- | --- |
| 1 | .88 | .62 | .40 |
| 2 | .81 | .54 | .31 |
| 3 | .90 | .63 | .30 |
| 4 | 1.05 | .74 | .34 |
| 5 | 1.18 | .93 | .32 |
| 6 | 1.02 | .72 | .28 |
| 7 | 1.01 | .71 | .30 |
| 8 | .96 | .66 | .40 |
| 9 | .84 | .54 | .30 |
| 10 | .96 | .64 | .34 |
| 11 | 1.05 | .75 | .30 |
| 12 | 1.00 | .68 | .30 |
| 13 | .85 | .56 | .30 |
| 14 | .84 | .55 | .34 |
| 15 | .93 | .65 | .37 |
| 16 | 1.27 | .97 | .36 |
| 17 | 1.57 | 1.27 | .33 |
| 18 | .70 | .44 | .26 |
| 19 | .70 | .44 | .26 |
| 20 | .80 | .51 | .32 |
| 21 | .79 | .52 | .32 |
| 22 | .81 | .51 | .34 |
| 23 | .68 | .43 | .32 |
| 24 | .74 | .50 | .36 |
| 25 | .80 | .49 | .21 |

It is evident from the results tabulated in the tables that the total "n" leg resitsance values in Table I ranged from 0.19 to 0.21 milliohm, with an average of .20 milliohm, for 12 couples. The total "n" leg electrical resistance values in Table II for the 25 couples tested varied from 0.21 to 0.40 milliohm with an average of 0.30 milliohm, or 50% higher on the average than the preceding group. Lead telluride pellets from both groups measured 0.32 milliohm prior to brazing. Therefore, the advantages of using the tin-zinc-gold alloy with lead telluride in a one-step brazing operation with germanium bismuth telluride providing the other leg of the couple is readily apparent.

It should be understood that the above description is illustrative and not limiting.

I claim as my invention:

1. A brazing alloy consisting of by weight from about 0.2% to 1% tin, from 10% to 12.7% zinc and the balance being gold with small amounts of incidental impurities.

2. A brazing alloy consisting of by weight approximately 0.25% tin, 12.7% zinc and the balance being gold with small amounts of incidental impurities.

3. A brazing alloy having a melting temperature range of from 625° C. to 680° C. capable of joining a lead telluride thermoelectric material to an electrical conductor, the joint formed thereby having relatively low electrical resistance, the alloy consisting of by weight from 0.2% to 1% tin, from 10% to 12.7% zinc and the balance being gold with small amounts of incidental impurities.

4. A brazing alloy having a melting temperature of about 680° C. capable of joining a lead telluride thermoelectric material to an electrical conductor, the joint formed thereby having relatively low electrical resistance, the alloy consisting of by weight 0.25% tin, 12.7% zinc and the balance being gold with small amounts of incidental impurities.

5. A thermoelectric device comprising at least one "n" leg consisting of lead telluride and at least one "p" leg consisting of germanium bismuth telluride, the ends of "n" leg having a metallic diffusion barrier layer of at least 2 mils thickness, the "p" and "n" legs being connected at one end by an electrical and thermal conductor comprising at least one metal selected from the group consisting of iron, cobalt, nickel and molybdenum, the legs being joined to said conductor at a temperature of from 625° C. to 685°C., the "n" leg being joined by a brazing alloy consisting of by weight from about 0.2% to 1% tin, from 10% to 12.7% zinc and the balance being gold with small amounts of incidental impurities.

References Cited by the Examiner
UNITED STATES PATENTS
1,339,009 5/20 Von Allen _____ 75—165
3,036,139 5/62 Feduska et al. _____ 136—5
3,037,064 5/62 Rosi et al. _____ 136—5

WINSTON A. DOUGLAS, *Primary Examiner.*
JOHN H. MACK, *Examiner.*